TAPE SPLICING METHOD AND MACHINE

Filed Oct. 4, 1972 7 Sheets-Sheet 1

June 4, 1974 J. L. KING 3,814,652

TAPE SPLICING METHOD AND MACHINE

Filed Oct. 4, 1972 7 Sheets-Sheet 2

TAPE SPLICING METHOD AND MACHINE

Filed Oct. 4, 1972 7 Sheets-Sheet 3

June 4, 1974 J. L. KING 3,814,652

TAPE SPLICING METHOD AND MACHINE

Filed Oct. 4, 1972 7 Sheets-Sheet 4

TAPE SPLICING METHOD AND MACHINE

United States Patent Office 3,814,652
Patented June 4, 1974

3,814,652

TAPE SPLICING METHOD AND MACHINE

James L. King, Sudbury, Mass., assignor to King Instrument Corporation, Hudson, Mass.

Filed Oct. 4, 1972, Ser. No. 294,970
Int. Cl. B31f 5/00
U.S. Cl. 156—159 17 Claims

ABSTRACT OF THE DISCLOSURE

A machine for tailoring and splicing together the end portions of two sections of magnetic tape. It includes two moveable splicing blocks adapted to support the two sections of tape, cutter means operative when the splicing blocks are spaced a predetermined distance for severing the end portions of the two tape sections so as to provide tailored ends suitable for splicing, means for moving the splicing blocks together so as to place the tailored ends of the two tape sections in abutting relation, and means for applying a piece of adhesive splicing tape onto the two tape sections in overlapping relation to their tailored ends and for pressing the piece of splicing tape into firm adherence with the two tape sections so as to form a strong splice.

The present invention pertains to apparatus for splicing magnetic tape, motion picture film and other tape or strip materials.

The primary object of this invention is to provide a splicing device useful in the manufacture of magnetic tape cassettes and cartridges as, for example, the so-called "8-track" cartridge. The latter type of cartridge consist of a housing containing a single hub on which is wound a predetermined quantity of magnetic tape whose ends are spliced together to form an endless recording medium. During use, the coil of tape supported on the hub is continuously unwound at the inside and rewound at the outside. It is desirable in such cartridges that the ends of the magnetic tape be tailored to provide clean, sharp edges so as to form a tight butt joint and that the splicing be effected by means of an adhesive splicing tape that is applied to the magnetic side of the recording medium. Furthermore, the splicing must be such that the butt joint will withstand the tension load encountered when the cartridge is being used for recording or playback purposes.

Accordingly, a more specific object of the invention is to provide an improved form of apparatus for splicing magnetic tape in a butt joint, with the splicing being effected by means of an adhesive splicing tape.

A further object of the invention is to provide a new apparatus for splicing magnetic tape which is relatively inexpensive to manufacture and easy to operate, expedites the manufacture of tape cartridges and cassettes and provides butt joining of magnetic tape in a manner which meets the requirements of the tape cartridge and cassette industry.

These and other objects hereinafter described or rendered obvious are achieved by an apparatus which comprises a splicing head consisting of two moveable splicing blocks each adapted to support the end of a length of tape, knife means for severing the ends of the tape supported on the splicing blocks so as to form clean, sharp end edges, means for applying a piece of adhesive splicing tape to the ends of the magnetic tape, and optional means for pressing the splicing tape onto the joined ends of the magnetic tape. Other details and features of the invention are set forth or described in the following specification which is to be considered together with the accompanying drawings, wherein:

Figure 1:
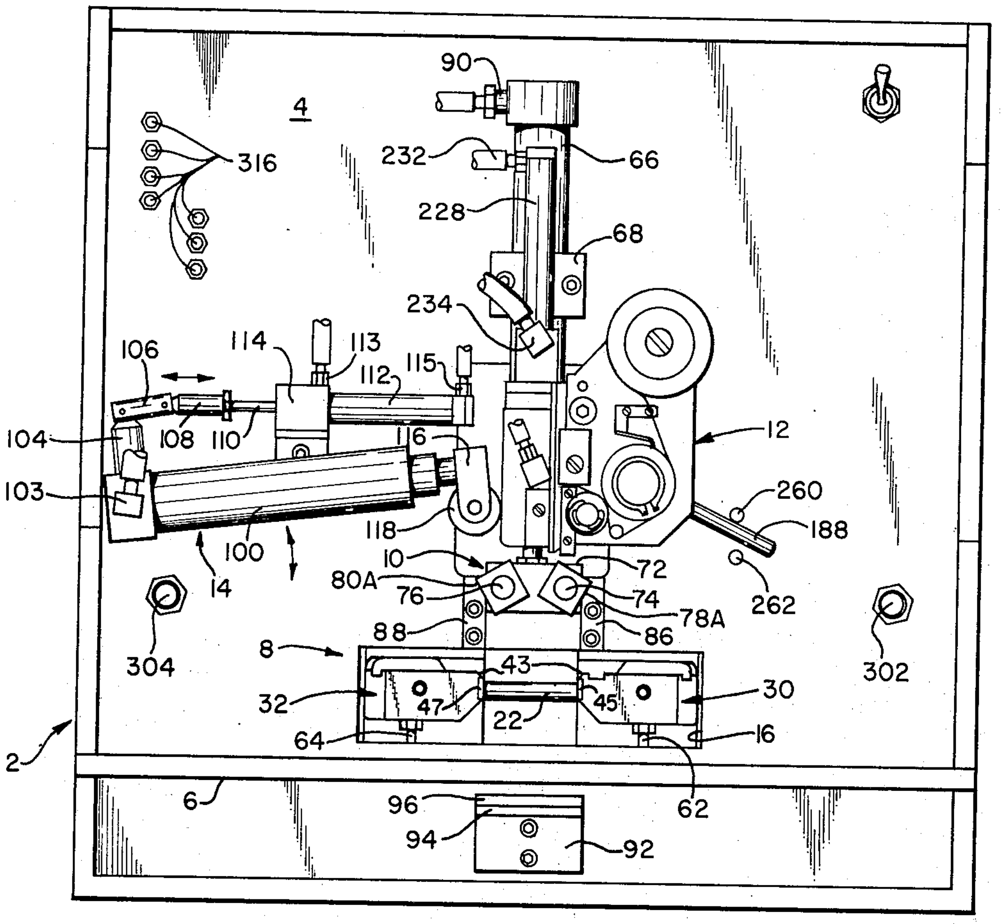
FIG. 1 is a front elevation of a machine constituting a preferred embodiment of the invention.

Referring now to FIG. 1, the illustrated machine comprises a housing 2 having a front panel 4 to which is mounted a horizontal shelf 6. The panel 4 serves as a support for much of the operating mechanism of the machine, including a splicing head generally identified by the numeral 8, a knife assembly generally identified by the numeral 10, a splicing tape dispenser-applicator generally identified by the numeral 12, and a splicing tape pressing mechanism generally identified by the numeral 14.

Figure 2:
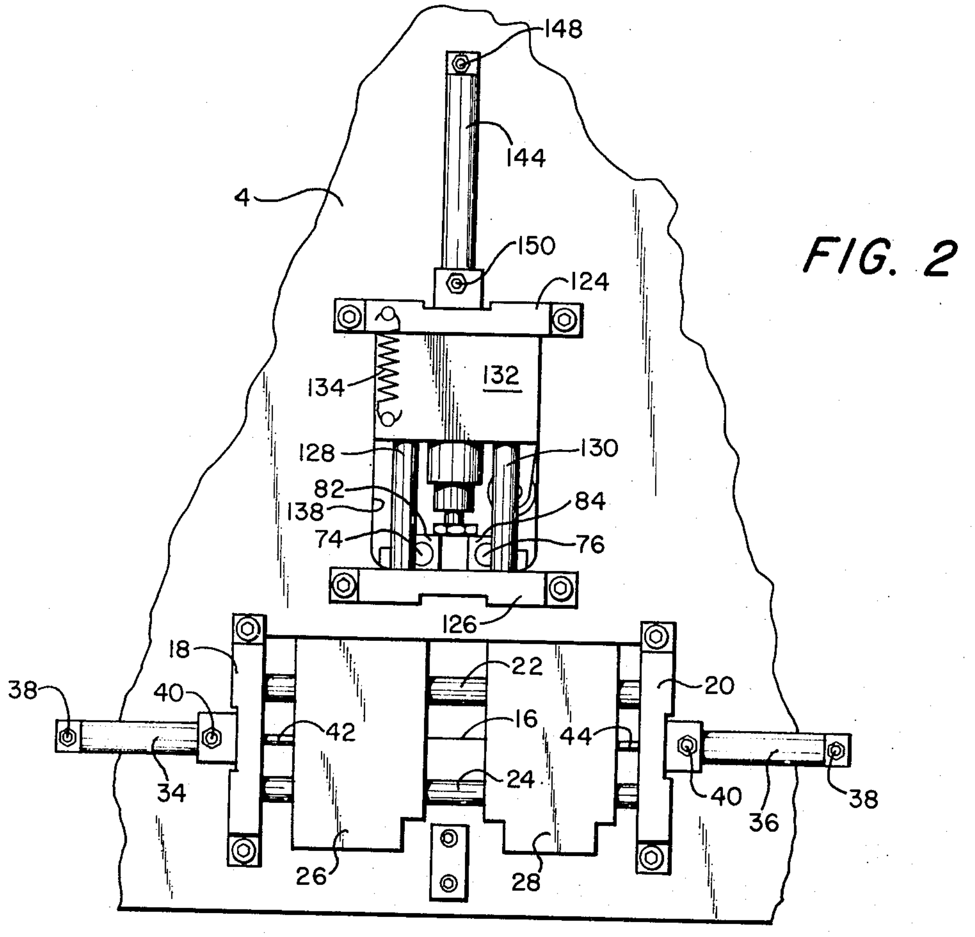
FIG. 2 is a fragmentary rear view in elevation on an enlarged scale illustrating a portion of the machine of FIG. 1.
Figure 3:
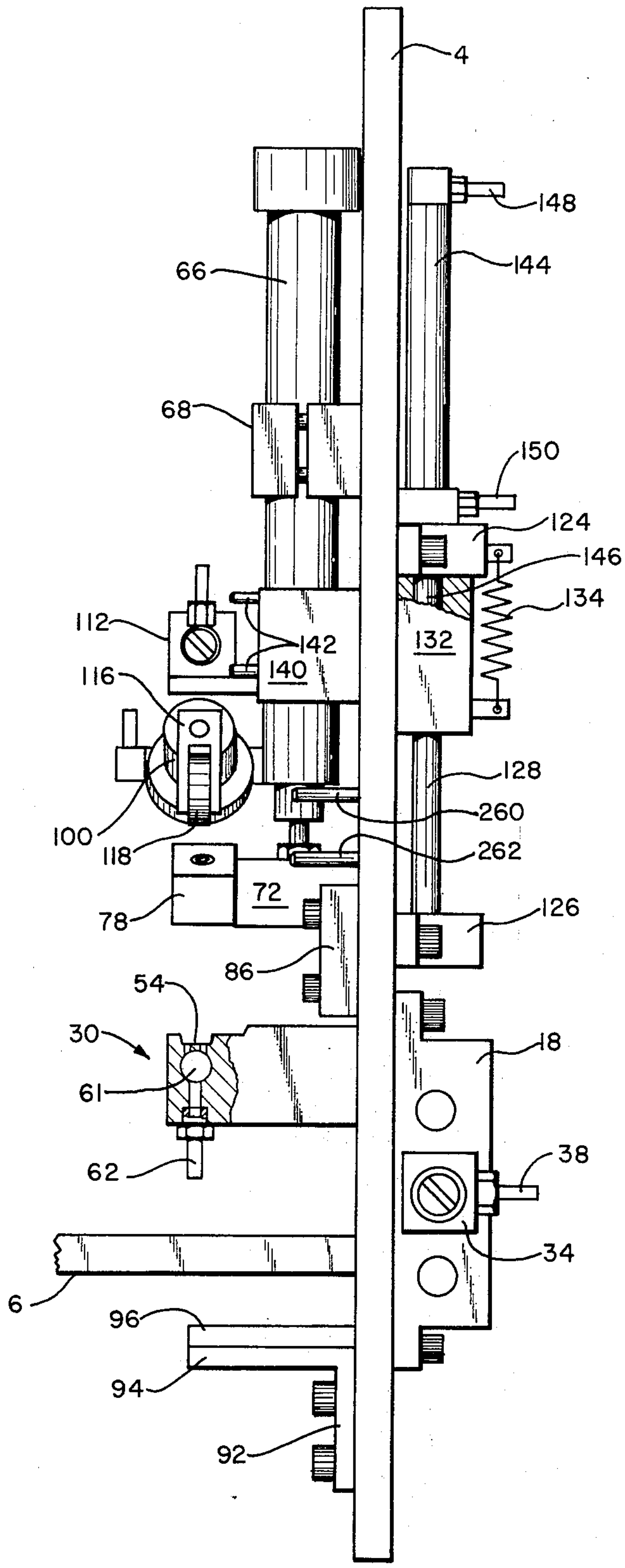
FIG. 3 is a side elevation of the front panel of the machine of FIG. 1.

Referring now to FIGS. 1–3, the front panel 4 is formed with a rectangular opening 16 which accommodates portions of the splicing head assembly. As seen in FIG. 2, two support plates 18 and 20 are affixed by screws to the rear side of the panel 4 at opposite ends of the opening 16. Attached to and extending between the plates 18 and 20 are two slide rods 22 and 24. Slideably mounted on the slide rods 22 and 24 are two slide blocks 26 and 28, the latter each having two parallel bores to accommodate the slide rods. These slide blocks are made of aluminum or steel and have extensions on their front sides in the form of two splicing blocks 30 and 32 which extend through the opening 16 so as to be accessible to the operator of the machine. These splicing blocks are moveable toward and away from one another to the extent determined by engagement of the slide blocks 26 and 28 with each other and with the support plates 18 and 20. Movement of the splicing blocks is achieved by means of two pneumatic actuators 34 and 36 which are secured to the support plates 18 and 20 respectively. These actuators are of the double acting type, each having a hose fitting 38 at one end and a second hose fitting 40 at the other end. The piston rod 42 of actuator 34 extends through an oversized hole in the plate 18 and is attached to the slide block 26. The piston rod 44 of actuator 36 is similarly attached to the slide block 28. Introduction of air into the actuators 34 and 36 via the fittings 38 will cause their piston rods to be extended to bring the slide blocks 26 and 28 together. Introducing of air through the fittings 40 will cause the piston rods 42 and 44 to be retracted to the extent determined by engagement of the slide blocks with support plates 18 and 20.

Figure 6:
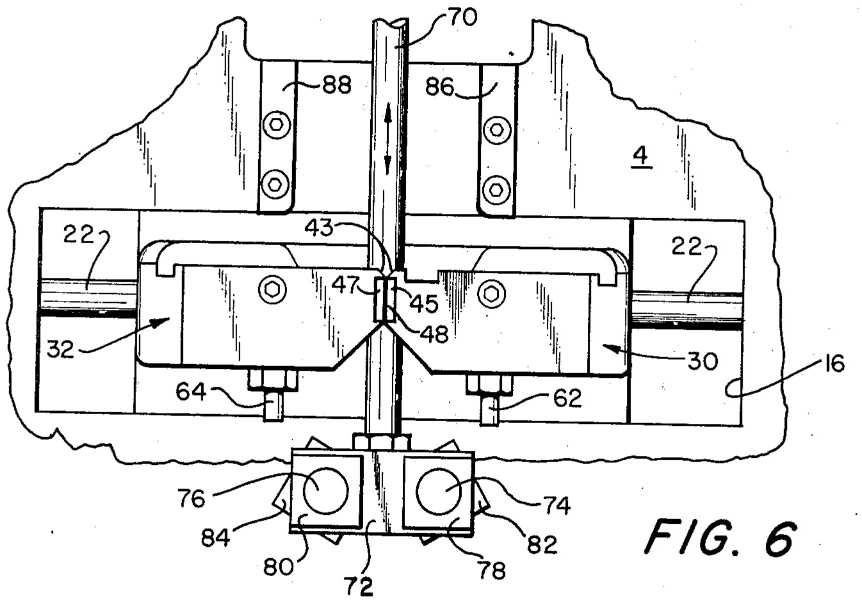
FIG. 6 is a fragmentary view in front elevation showing the portions of the shiftable splicer blocks and the knife assembly immediately after the tape severing operation has been executed.
Figure 4:
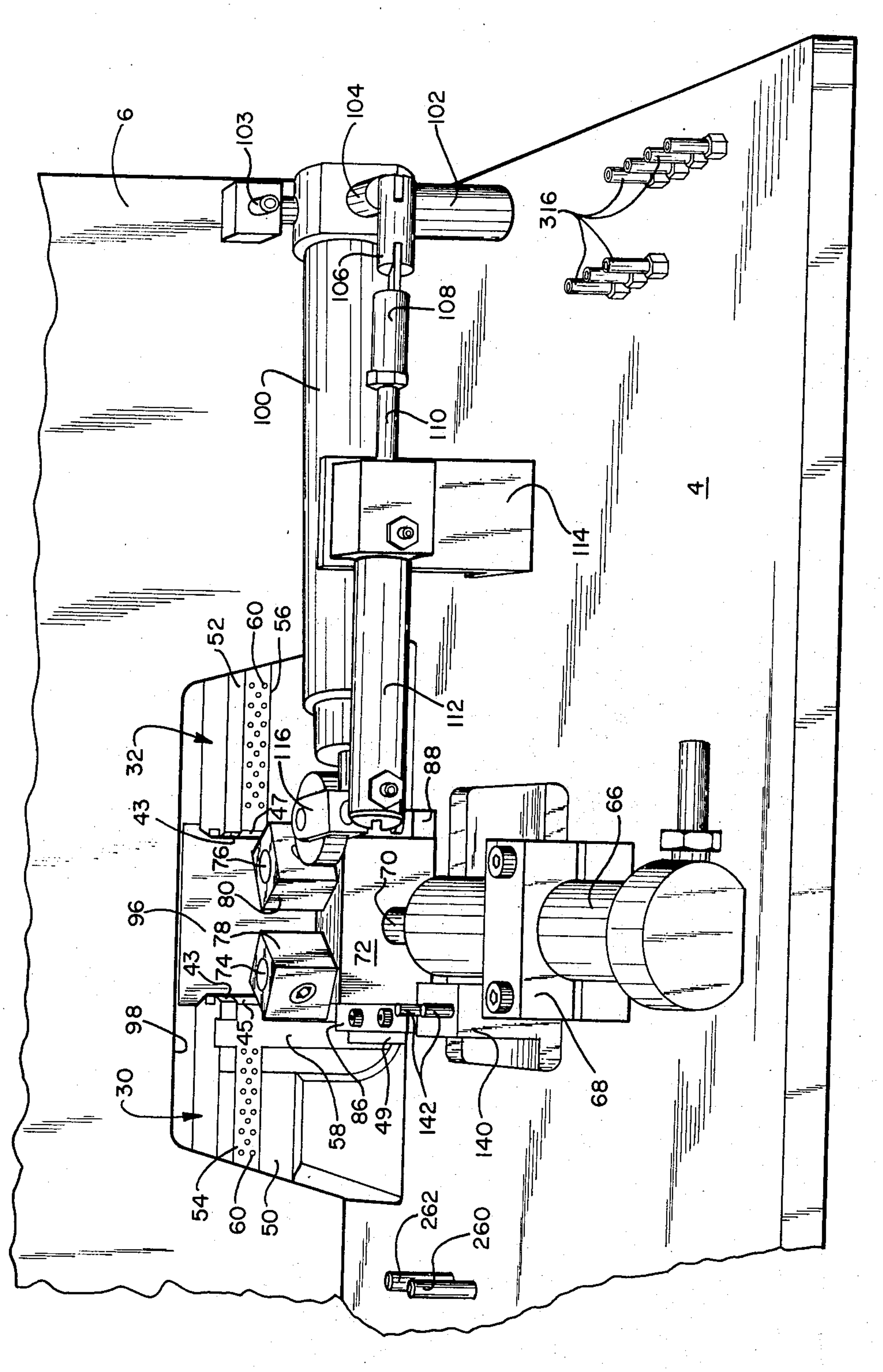
FIG. 4 is a fragmentary perspective view of the apparatus shown in FIG. 3.

With reference to FIGS. 1 and 6, the confronting, i.e. adjacent, ends of slide blocks 30 and 32 are bevelled as shown at 43 and have recesses in which are secured hardened tool steel plates 45 and 47 that have flat top and side surfaces 46 and 48 that meet in a sharp square edge as shown. Slide blocks 30 and 32 also are recessed as shown at 49 (FIG. 4) so as to provide clearance for the cams of the knife assembly hereinafter described. The two slide blocks also have flat horizontally extending upper surfaces 50 and 52 which are provided with like and aligned grooves 54 and 56. The top ends of plates 45 and 47 are flush with the bottom surfaces of grooves 54 and 56. The grooves 54 and 56 have a width just sufficient to accommodate the magnetic tape to be spliced and their depth is sufficient so that the side walls thereof will restrain the magnetic tape against movement perpendicular to the front panel 4. The upper surface of the splicing block 30 has an additional groove 58 which extends at a right angle to and intersects the groove 54. The purpose of the groove 58 is to provide clearance for a portion of the splicing tape dispenser-applicator during operation of that mechanism. Referring to FIGS. 3 and 4 the bases or bottom walls of grooves 54 and 56 are provided with a plurality of small openings 60 that communicate via a chamber 61 formed interior of each splicing block with hose fittings 62 and 64 that are mounted in openings in the underside of the two splicing blocks. Vacuum applied via appropriate hose lines (not shown), fittings 62 and 64, chambers 61 and openings 60 provide a suction effect that holds the tape ends to be spliced against the bottom walls of the grooves 54 and 56.

Referring now to FIGS. 1–6, the knife mechanism comprises a pneumatic actuator 66 of the single acting variety. The actuator 66 is held in fixed relation to the panel 4 by means of a two-piece bracket 68 whch is bolted to the panel. Attached to the piston rod 70 of actuator 66 is a knife support block 72. The block 72 has two parallel bores that extend perpendicular to the panel 4 and in which are mounted two circular shafts 74 and 76. The latter are rotatable on their axes relative to block 72. Attached to the forward ends of shafts 74 and 76 are two knife blocks or cutters 78 and 80 made of hardened tool steel. These cutters 78 and 80 are square in cross-section and are characterized by flat smooth side surfaces. The cutters are sized and the shafts 74 and 76 are spaced so that when the cutters are oriented as shown in FIG. 5A and the splicing blocks are fully separated as shown in FIG. 1, there is just enough clearance to permit the cutters to pass down between the splicing blocks. Attached to the rear ends of the shafts 74 and 76 are two cams 82 and 84. These cams also are square in cross-section and have flat smooth side surfaces. The knife blocks 78 and 80 and the cams 82 and 84 are secured to shafts 74 and 76 by suitable means, e.g. set screws or roll pins. The cutter blocks and the cams are mounted on the shafts 74 and 76 so that the sides of the cutter blocks are oriented at an angle of approximately 30° with respect to corresponding sides of the cams, as shown in FIG. 5A.

Associated with the above-described knife mechanism are two guide plates 86 and 88 which are affixed to the front side of the panel 4 in spaced relations to each other as shown in FIG. 1. The guide plates are spaced so that the cams can move down between them only when the surfaces of the cams extend horizontally and vertically as shown in FIG. 2. The bottom ends of the guides 86 and 88 terminate at the upper edge of the opening 16 in spaced relation to the upper surfaces of splicing blocks 30 and 32. The inner or confronting surfaces of the guides 86 and 88 are flat and spaced from each other the same distance as the confronting surfaces of plates 45 and 47 mounted on the splicing blocks 30 and 32 when the latter are withdrawn or separated to the extent permitted by engagement of slide blocks 26 and 28 with plates 18 and 20.

Figure 5A:
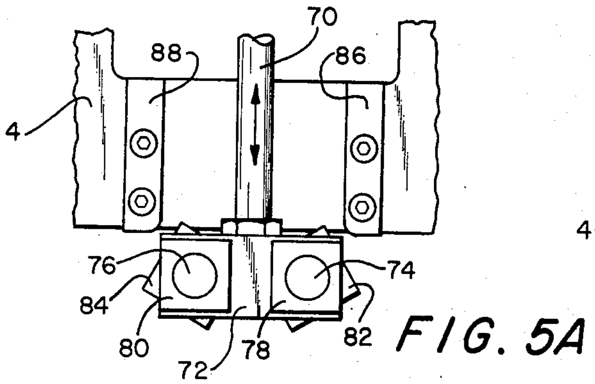
FIG. 5A is a fragmentary view in front elevation showing one position of the knife assembly.
Figure 5B:
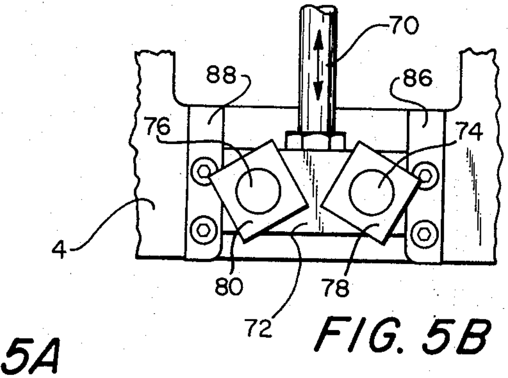
FIG. 5B is a view similar to FIG. 5A showing the knife assembly in a second position.

Operation of the cutter mechanism is as follows: Normally the actuator 66, due to its built-in return spring, has its piston rod 70 retracted in the manner shown in FIG. 1, in which position the cams 82 and 84 are disposed between the two guides 86 and 88 at the upper ends of the latter. In this position of the block 72, the cutters 78 and 80 are oriented as shown in FIG. 1. In this connection it is to be noted that the cutters 78 and 80 are disposed in a plane in front of the front surfaces of the guides 86 and 88 and the recesses 49 of the splicing blocks are sized to allow the cams to pass down behind the blocks when actuator 66 is operated. When air is introduced to the cylinder of actuator 66 via a hose attached to the fitting 90 (FIG. 1), the piston rod 70 is extended. As the piston rod is extended, the cams 82 and 84 pass down between the guides 86 and 88 (FIG. 5B) and the coaction between the guides and the cams prevents the cutters 78 and 80 from rotating out of their original orientation. However, as the cams pass out from between the guides 86 and 88, the shafts 74 and 76 are now free to rotate in the block 72. Accordingly, assuming that the splicer blocks 30 and 32 are separated as shown in FIG. 1, as the knife members 78 and 80 pass down below the guides 86 and 88, they engage the upper edges of the plates 45 and 47 and are cammed by the latter counterclockwise and clockwise respectively so that their side surfaces will extend vertically and horizontally as shown in FIG. 5A and so that they can pass down between the splicer blocks. The cutter blocks act to sever the ends of tape supported on the splicing blocks 30 and 32 by virtue of a hammer-like shearing action as they engage and pass the upper edges of plates 45 and 47. The newly formed end edges of the tape sections supported on the splicing blocks are straight and sharp and substantially flush with the confronting vertical surfaces 48 of plates 45 and 47.

In order to minimize wear on the actuator 66 and to limit the extension of its piston rod, it is preferred to mount a bracket 92 on the front panel of the machine below the shelf 6. As seen in FIGS. 1 and 3, the bracket has an L-shaped construction, providing a horizontal flange 94 directly below the knife carriage block 72. Mounted on the upper surface of the flange is a resilient pad 96. The shelf 6 is provided with an opening 98 (FIG. 4) through which the knife carriage 72 can move down into engagement with the resilient pad 96. Engagement of the knife block 72 with resilient pad 96 stops the extension of the piston rod 70 and thereby extends the life of the actuator 66. The opening 98 also is used as a feed-through for the vacuum hose lines that are attached to the fittings 62 and 64.

The splicing tape pressing mechanism 14 comprises a single acting actuator 100 which is pivotally mounted on a shaft 102 which is affixed to the front panel 4 of the machine and has a hose fitting 103 through which air is admitted to its cylinder. Affixed to that same end of the actuator 100 is an arm 104 which is connected via a link 106 and a coupling 108 to the piston rod 110 of a double acting pneumatic actuator 112 that is attached to the panel 4 by means of a bracket 114. Actuator 112 has hose fittings 113 and 115 for admitting air to one end or the other of its cylinder. Attached to the piston rod of actuator 100 is a roller assembly comprising a yoke 116 carrying a roller 118. The piston rod 110 of actuator 112 is normally extended in the position shown in FIG. 1 and when so extended, it acts through coupling 108, link 106 and arm 104 to prevent the actuator 100 from pivoting clockwise, i.e., it holds it in the raised position of FIG. 1. When the actuator 112 is operated so as to retract its piston rod 110 (this being accomplished by supplying air via fitting 113), the actuator 100 is caused to pivot clockwise so as to lower the roller 118 down onto the splicing block 32. The actuator 100 is spaced from panel 4 so that its rollers 118 is aligned with the groove 56 of splicing block 32. Once the roller 118 is in engagement with splicing block 32, if the actuator 100 is operated by supplying air thereto via the fitting 103, its piston rod will be extended and this motion will cause roller 118 to roll over the splicing block 32 onto the splicing block 30 and thereby press a piece of splicing tape (previously applied by the dispenser-applicator 12) firmly against the butt joined ends of magnetic tape supported on the splicing blocks. When the supply of air to the actuator 110 via fitting 103 is terminated, the piston rod of that actuator will be rapidly retracted by the actuator's built-in spring. Terminating flow of air to actuator 112 via its fitting 113 and applying pressurized air to the other end of its cylinder via fitting 115 will cause the piston rod 110 to be extended, with the result that actuator 100 will rotate counterclockwise back to the position shown in FIG. 1.

Turning now to FIGS. 1 and 2 and also FIG. 4, the splicing tape dispenser-applicator 12 is mounted for reciprocal vertical movement. The means for effecting the vertical reciprocal movement of the splicing tape dispenser-applicator comprises a pair of spaced support plates 124 and 126 affixed to the rear side of panel 4. Attached to and extending between these two plates are two slide rods 128 and 130. Slideably mounted on the two slide rods 128 and 130 is a slide block 132, the latter having two parallel bores through which extend the two slide rods. Slide block 132 is movable from engagement with plate 124 into engagement with plate 126 and vice versa. A coil tension spring 134 is connected between plate 124 and slide block 132 as shown. Spring 134 serves to urge slide block 132 into engagement with the plate 124 as shown in FIG. 2.

The panel 4 is provided with a second rectangular opening 138 that is located in front of slide rods 128 and 130. The purpose of the opening 138 is to accommodate a projection 140 on the front side of block 132. The projection 140 is provided with a pair of vertically spaced pins 142 that serve as mounting elements for the splicing tape dispenser-applicator 12.

Reciprocal movement of slide 132 is controlled by a double-acting pneumatic actuator 144 which is attached to and supported by plate 124. The piston rod 146 (see FIG. 3) of actuator 144 extends through an oversized hole in plate 124 and is affixed to slide block 132. Actuator 144 has hose fittings 148 and 150 at the opposite ends of its cylinder for connection of hoses whereby air is supplied to cause extension or retraction of its piston rod. Spring 134 assures that the slide block will always be in the raised position whenever the air supply for the machine is turned off and also, by balancing the weight of slide 132 and dispenser-applicator 12, assists actuator 144 to rapidly restore slide block 132 to its raised position after the splicing tape dispenser-applicator has dispensed and applied a piece of splicing tape onto the ends of magnetic tape supported by splicing blocks 30 and 32. As is believed obvious, air admitted through fitting 148 will cause the piston rod 146 of actuator 144 to be extended, whereby the slide block 132 will move down until it engages plate 126. When the flow of air through the fitting 148 is terminated, and air is admitted via fitting 150, the piston rod 146 will be retracted, whereby the slide block 100 will move up until it reengages plate 124.

Figure 7:
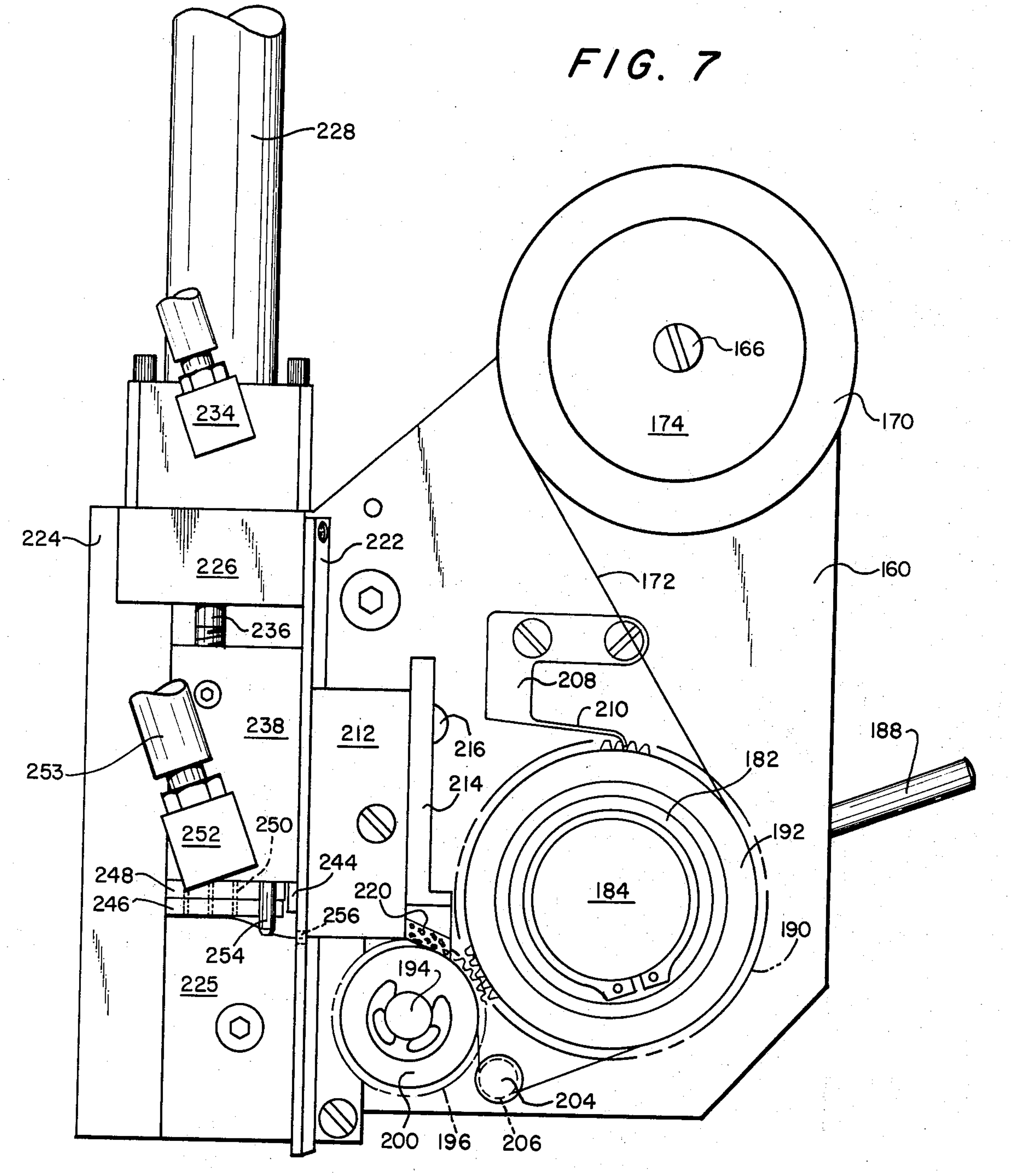
FIG. 7 is an enlarged front view of the splicing tape dispenser applicator.
Figure 8:
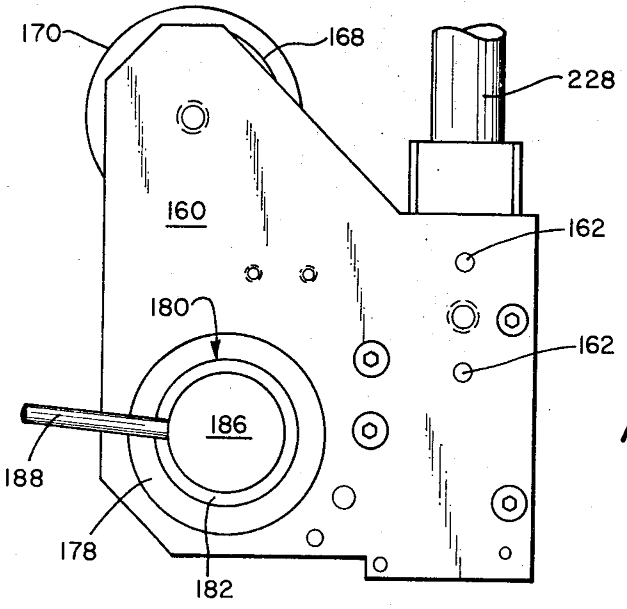
FIG. 8 is a rear view on a different scale than FIG. 7 of the splicing tape dispenser-applicator.

The splicing tape dispenser-applicator is essentially the same as the one shown and described in my copending U.S. Pat. application Ser. No. 155,023, filed June 21, 1971, now U.S. Pat. No 3,753,835, issued Aug. 21, 1973, for "Splicing Tape Dispenser Applicator." Essentially the splicing tape dispenser-applicator 12 is adapted to dispense and sever a piece of adhesive-backed splicing tape from a supply roll and to apply the severed piece to the abutting ends of two tapes supported by the two splicing blocks. Details of the splicing tape dispenser-applicator unit are shown in FIGS. 1, 7 and 8. Essentially the unit 8 comprises a carriage plate 160 having a pair of holes 162 that snugly receive the mounting pins 142 affixed to the projections 140 of slide 132. Thus the carriage plate 160 may be detached readily from the slide 132.

Mounted to carriage plate 160 is a hub 166 having an enlarged flange 168 that serves to rotatably support a roll 170 of splicing tape 172 which is coated on one side with a pressure-sensitive adhesive. Roll 170 is held in place on hub 166 by means of a plastic cap 174 which is adapted to slip over and make a friction fit with the hub. Roll 170 is positioned by cap 174 and flange 168 in planar alignment with feed rolls hereinafter described.

Referring now to FIG. 8, carriage plate 160 has a large hole in which is mounted a roller bearing unit 178. The outer race of the bearing unit is locked to plate 160 by a force fit. The inner race of the bearing unit surrounds and is secured to an over-running or one-way clutch unit, identified generally by the numeral 180, which preferably is a type CD drawn cup precision overrunning roller clutch manufactured by the Torrington Company of Torrington, Conn. This form of clutch unit has inclined cam surfaces and rollers that are spring-biased against the inclined surfaces, so that a driving relationship is established by the clutch between two driver members in one direction of relative rotation between said members and an overrunning relationship is established in the opposite direction of relative rotation (see U.S. Pats. 3,184,020 and 3,260,333). As seen in FIGS. 7 and 8, the clutch unit comprises a cylindrical housing 182 which is secured to the inner race of bearing unit 178, and mounted within the clutch unit is a drive shaft 184. Affixed to the rear end of shaft 184 is a hub 186 that carries a radially extending arm 188. Clutch unit 180 is mounted so that clockwise rotation of shaft 184 (as seen in FIG. 7) will cause housing 182 to rotate with it, while counterclockwise rotation will establish an overrunning relationship so that housing 182 will not rotate with shaft 184.

Other forms of one-way clutches having inclined cam surfaces and rollers that are spring-biased against the inclined surfaces are well known in the art and are exemplified by U.S. Pats. 3,482,667, 3,476,226, 2,832,450, 2,912,086, 3,194,369, and 2,569,108. These and other types of overrunning clutches known to persons skilled in the art may be used for the same purpose as clutch unit 168.

Surrounding and secured to the clutch housing 182 is a large spur gear 190 and a tape feeding wheel or roll 192. Also affixed to carriage plate 160 is a short stub shaft 194. Rotatably mounted on this stub shaft are a second smaller spur gear 196 and a second smaller feed wheel or roll 200. The latter is connected to gear 196 so that they can rotate as a unit. Although not shown, it is to be understood that the feed rolls 192 and 200 each have a circumferential groove that is just wide enough to receive and guide tape 172. These grooves are in planar alignment with tape roll 170. Gear 196 meshes with gear 190. A tape guide pin 204 is also affixed to carriage plate 160 below feed roll 192. Pin 204 has a peripheral groove as shown at 206 which is just wide enough to accommodate and guide tape 172 and is aligned with the grooves in feed rolls 192 and 200.

Also attached to the carriage plate 140 is a spring latch 208 having a finger 210 which presses against the teeth of gear 190 and prevents rotation of that gear under the influence of shock and vibration when no rotational force is being exerted on drive shaft 184. The finger 210 also prevents counterclockwise rotation of gear 190 and feed roll 192.

Mounted above stub shaft 194 on carriage plate 160 is a small block 212. Adjustably mounted to block 212 is an elongate arm 214 which is held in place by a screw 216. The bottom end of arm 214 is provided with an inclined resilient pad 220 which is sized so as to fit into the circumferential groove of feed roll 200. The pad 220 is preferably made of cork but also may be made of rubber or a low friction plastic such as Teflon. The pad 220 maintains the splicing tape 172 against feed roll 200.

Also carried by plate 160 are two vertically extending members 222 and 224 that define a vertical channel 225. These members are spaced from each other and are connected at their top ends by a horizontally extending plate 226 which serves as a mounting plate for a double-acting fluid pressure actuator 228. It is to be noted that plate 222 is canted relative to plate 224 (as seen in FIG. 7) and also extends below member 224. Actuator 228 is provided with hose fittings 232 and 234 (see FIG. 1) for admitting air to the opposite ends of its cylinder. The piston rod 236 of actuator 228 extends through an oversized hole in mounting plate 226 down into the channel 225. Attached to the end of piston 236 is a plunger 238. The at-rest position of plunger 238 is as seen in FIG. 7. The side of plunger 238 facing plate 222 is bevelled so as to smoothly engage the adjacent face of that plate. This same side of plunger 238 has a longitudinally extending groove (not shown) and mounted in this groove is a cutter blade 244. Cutter blade 244 slideably engages the inner surface of plate 222. The cutter blade 244 and the plate 222 are made of high quality tool steel. The bottom end of the plunger 238 is provided with a resilient pad 246 having a width (i.e. its dimension perpendicular to the plane of FIG. 7) which is slightly greater than the width of the splicing tape 172. The pad 246 is attached to a rib 248 formed on the bottom end of the plunger 238. The pad 246 and the rib 248 are provided with a plurality of aligned holes as indicated at 250 which communicate with an interior chamber in the plunger 238. The interior chamber of plunger 238 has an inlet port in which is mounted a hose fitting 252. Hose fitting 252 is connected by a hose 253 to a source of vacuum through appropriate valve means. By applying vacuum through hose fitting 252, it is possible to create a suction effect on the bottom surface of pad 246 which will hold tape 172 tight against the pad. The plunger 238 is also provided with a pair of vertically extending pins 254 which project downward along the opposite sides of the rib 248 and the pad 246. The pins 254 serve to guide splicing tape as it is fed into the channel 225. The splicing tape is introduced into this channel through a horizontal slit 256 formed in plate 222. Thus as shown in FIG. 7, the path followed by the splicing tape is around the feed roll 192, under and around guide pin 204, up and around feed roll 200 and under the pad 220, and through horizontal slit 256 into the channel 225 below the plunger 238.

Referring now to FIG. 1, the panel 4 carries two vertically spaced pins 260 and 262 on its front side and disposed between them is the arm 188 carried by hub 186. Pins 260 and 262 act to cause arm 188, and thereby shaft 182, to rotate counterclockwise (as seen in FIGS. 1 and 7) when carriage plate 160 is moved downward by operation of actuator 144 and clockwise when the plate is moved upward again. Due to the operation of clutch unit 180, feed rolls 192 and 200 rotate to feed tape 172 when the carriage plate 160 moves upward and remains stationary when the carriage plate moves downward. Pins 260 and 262 are spaced by an amount, determined by the length of travel of carriage plate 160, such as to cause arm 188 to rotate the two feed rolls just enough to advance the splicing tape through a distance equal to or slightly less than the distance between the inner face of member 222 and the confronting face of member 224.

The mode of operation of the splicing tape dispenser-applicator 12 is as follows: First actuator 144 is operated to drive the carriage plate 160 of the dispensing mechanism downwardly far enough for the plate 222 to enter groove 58 and engage or nearly engage splicing block 30. Then with the carriage plate in this down position, the actuator 228 is operated so as to cause its plunger 238 to move downward in channel 225. Simultaneously vacuum is applied to plunger 238 via hose fitting 252. Assuming that the leading end of the splicing tape 172 has previously been fed through the slit 256 and extends fully across channel 225 beneath pad 246, the vacuum applied via fitting 252 creates a suction effect that holds the end of the splicing tape up against the pad 246. As the plunger moves downwardly, its cutter member 244 severs the splicing tape by a shearing action at the point where the tape comes through the slit 256. The severed portion of splicing tape, held against pad 246 by suction, is driven downwardly by the plunger 238 into engagement with the tapes in grooves 54 and 56, whereby the pressure-sensitive adhesive coating on the splicing tape causes the splicing tape to be attached to the two tapes. Immediately thereafter, actuator 228 is caused to raise plunger 238 back to its original position. However, as the plunger 238 reaches the bottom end of its downward stroke and before it starts to move upward again, the vacuum being applied through hose fitting 252 is terminated, thereby releasing the splicing tape from the plunger and allowing the splicing tape to remain in contact with the spliced tapes on the splicing blocks as the plunger 238 moves upwardly again to its original position. As the plunger 238 moves upwardly again, or after it has returned to its original elevated position, the actuator 144 is operated so as to cause the carriage plate 160 to move upwardly again to its original raised position. As the carriage plate moves upwardly, the arm 188, which is restrained by pin 260, rotates and thereby causes the shaft 184 to rotate. This rotation of shaft 182 causes the gears 190 and 196 to rotate clockwise and counterclockwise respectively (as seen in FIG. 7) so as to advance an additional length of splicing tape into the space between the members 222 and 224 in anticipation of the next cycle of operation of the splicing tape dispenser as above described. It is to be noted that vacuum may be applied through the fitting 252 immediately after the carriage plate has returned to its original elevated position (instead of at the time when actuator 228 is operated to move plunger 238 downward) so as to cause the portion of the splicing tape 164 in the channel 225 to be held to the pad 246 by suction (as shown in FIG. 7).

Figure 9:
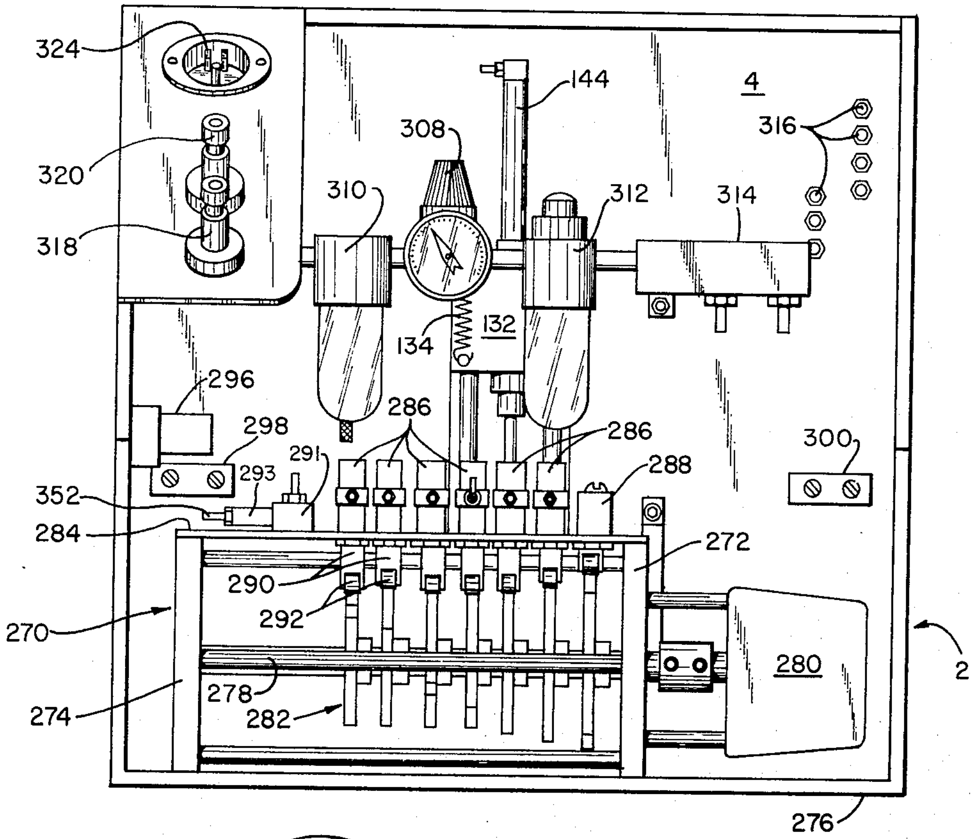
FIG. 9 is a rear elevation of the machine of FIG. 1.

Turning now to FIG. 9, the illustrated machine also includes a motor-driven programmer generally identified by the numeral 270. The programmer comprises a pair of spaced plates 272 and 274 which are attached to the bottom wall 276 of the housing 2. Extending between and journaled in these plates is a shaft 278 which is coupled to and driven by an electric motor 280. Mounted on shaft 278 are seven cams generally identified by the numeral 282. The cams are of predetermined peripheral configuration, with the configuration of the several cams determining the sequence of operations of the several machanisms hereinabove described The particular shape of the individual cams is illustrated in FIG. 10.

The programmer 270 also includes a plate 284 which is attached to the top ends of plates 272 and 274. Mounted to plate 284 are six air valves 286 and an electric motor control switch 288. Valves 286 and the switch 288 have spring-biased actuator buttons 289 that are operated by spring-biased operator members 290 provided with rollers 292 that ride on the peripheries of cams 282. Also, mounted on plate 284 is a seventh air valve 291, hereinafter referred to as the vacuum pilot valve, which is mechanically coupled to and operated by a small single-acting pneumatic actuator 293. Also forming part of the control system of the illustrated apparatus is a relay 296 and a pair of push-button switches 298 and 300. The two switches are attached to the rear side of the front panel 4 and are provided with operating spring-biased push buttons 302 and 304 respectively (Figure 1) which are depressed by the operator when it is desired to initiate operation of the machine. Also forming part of the apparatus is an assemblage of components including a pressure regulator 308, filters 310 and 312, and an air manifold 314 which serve to process and distribute pressurized air to the various actuating mechanisms. Coupling of hose lines (not shown) to the several actuators is accomplished by means of fittings 316 mounted on the front panel of the machine. Additional hose lines (not shown) are used to connect air manifold 314 to the fittings 316. Supplies of pressurized air and vacuum are connected to the machine via a pair of fittings 318 and 320 respectively mounted on the rear side of the housing 2. Fitting 318 is connected to filter 310. Additional hose lines (not shown) connect fitting 320 to the splicing blocks 30 and 32 and to pilot valve 291 which controls application of vacuum to the plunger 238. Electrical power is supplied to the machine via a receptacle 324.

Figures 10, 10A:
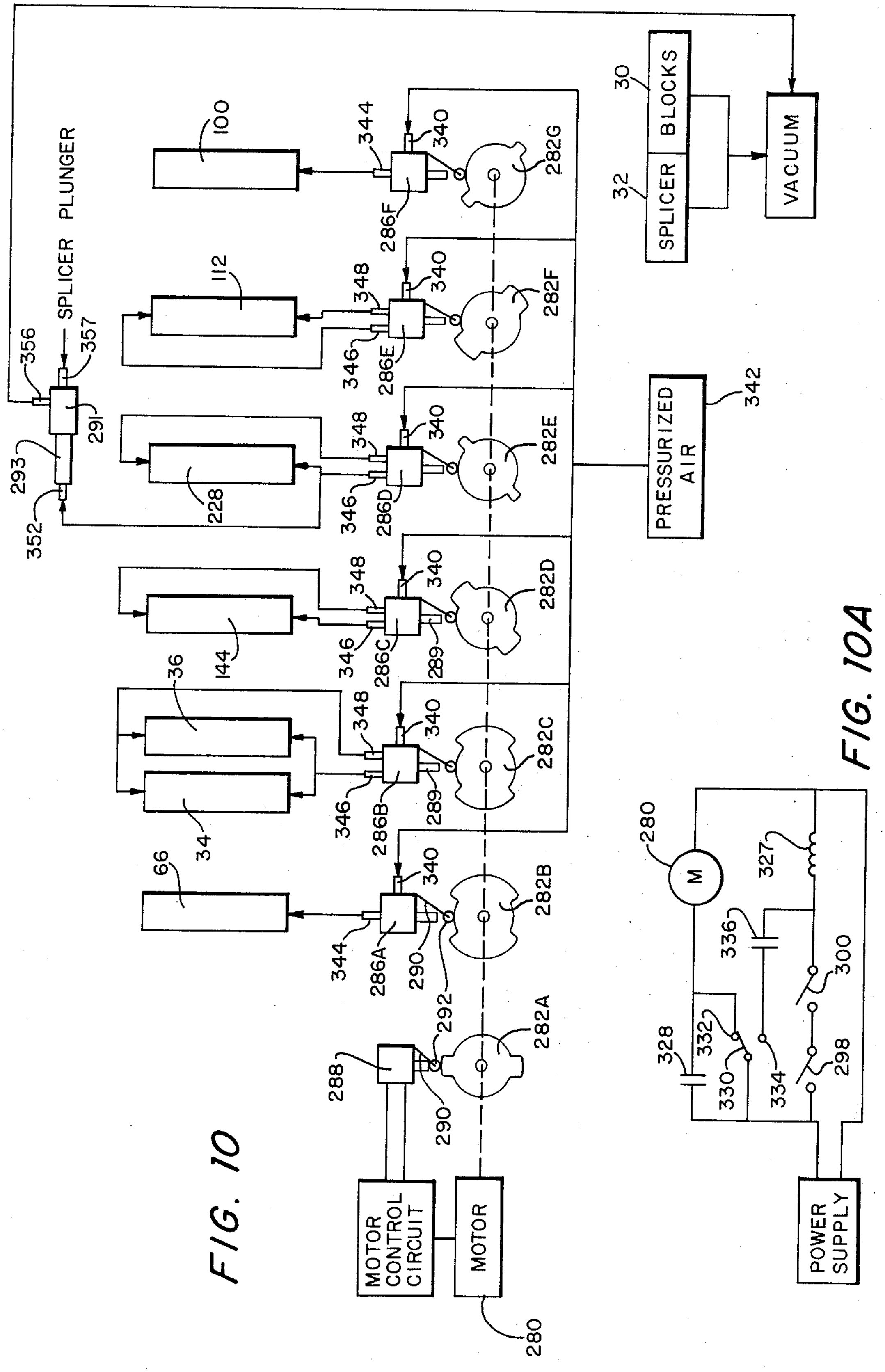
FIG. 10 is a schematic view illustrating the control system of the same machine.
FIG. 10A illustrates one form of motor control circuit for the control system of FIG. 10.

The overall control system of the machine is illustrated schematically in FIGS. 10 and 10A. The two switches 298 and 300 and the solenoid coil 327 of relay 296 are connected in series with a suitable power supply which is coupled to the machine via receptacle 324. Relay 296 is of the type comprising two pairs of normally open contacts, with one pair of contacts 328 connected in series with the motor and power supply. The motor control switch 288 is of the single role, double throw variety with its moveable contact 330 being spring-biased into closed position with one of its stationary contacts 332. Switch 288 is connected so that its normally open stationary contact 334 is in series with the second pair of relay contacts 336 and the solenoid coil, and its normally closed contact 332 is connected to one side of the motor. Switch 288 in the condition opposite to that shown in FIG. 10 so long as its actuating finger 290 is forced up by one of the lobes on cam 282A, and returns to the illustrated condition when the cam lobe has rotated enough to release its actuating finger.

Still referring to FIG. 10, the cams are shown in the position which they occupy when the machine has operated through one complete cycle. In this connection it is to be noted that each cam has two diametrically opposed lobes of identical shape and size, with the arcuate length of the lobes on the cams being such as to effect operation of the associated switch and valves for preselected times and in the desired sequence as explained more fully below.

The valves 286A and 286F are single acting, i.e. two-way valves, while valves 286B, 286C, 286D and 286E are double-acting, i.e. three-way valves. The inlet ports 340 of all of the valves are connected to a common source 342 of pressurized air via the manifold 314 and the regulating and filtering system. The single outlet ports 344 of valves 286A and 286F are connected via suitable hose lines to the inlet fittings previously described of the single-acting actuators 66 and 100 respectively. The two outlet ports 346 and 348 of valve 286B are connected to the hose fittings 38 and 40 respectively at the opposite ends of each of the double-acting actuators 34 and 36. The two outlet ports 346 and 348 of valve 286C are connected to the fittings 148 and 150 respectively of actuator 144. The two outlet ports 346 and 348 of valve 286D are connected to the fittings 232 and 234 respectively of actuator 228. The ports 346 and 348 of valve 286E are connected to the fittings 113 and 115 respectively of actuator 112. So long as their operator members 290 are not deflected by the lobes of the cams associated therewith, valves 286A and 286F are closed and valves 286B, C, D and E are closed with respect to their ports 346 and open with respect to their ports 348. When their actuating fingers are engaged by the lobes of the cams, valves 286A and 286F open and valves 286B–E open with respect to their ports 346 and close with respect to their ports 348.

The outlet port 346 of valve 286D also is connected via a hose line to the inlet fitting 352 of vacuum pilot valve actuator 293. The latter's piston rod (not shown) is aligned with the spring-biased actuating button (not shown) of vacuum pilot valve 291 which is normally closed. Application of pressurized air to actuator 293 causes its piston rod to be extended for enough to cause valve 291 to open. The inlet port 356 of vacuum pilot valve 291 is connected to a source of vacuum via hose line (not shown) and the vacuum fitting 320 (FIG. 9). The outlet port 357 of valve 291 is connected via a hose line (not shown) to the fitting 252 on the plunger 238 of the splicing tape dispenser-applicator. Hose lines also connect the vacuum fitting 320 to the fittings 62 and 64 on splicing blocks 30 and 32 so as to provide the desired suction effect on the tape ends that are being spliced.

Operation of the machine is as follows: Assume that the machine has just completed one cycle of operation so that the cams are positioned as illustrated and vacuum is being applied constantly to the two splicing blocks via fittings 62 and 64. The operator now takes two ends of magnetic tape, e.g. the ends of a length of tape wound on the hub for an 8-track cartridge and places one end in the groove 54 of splicing block 30 and the other end in the corresponding groove 56 of splicing block 32. The tape ends are located so that they project over and beyond the plates 45 and 47 on the confronting faces of the two blocks and so that their magnetic recording sides face up in the grooves. The vacuum applied to the two splicing blocks holds the tape ends in the grooves 54 and 56 so that no other holding means need be employed and so that the operator can move his hands away from the splicing blocks. Next the operator uses one hand to press the actuating button 302 of switch 298 and his other hand to press the actuating button 304 of switch 300. As soon as both switches are closed, the solenoid of relay 296 is energized. This closes contacts 328 and 336. Since at this time the motor control switch is closed on its contact 334, the closing of contacts 336 will establish a holding circuit for the solenoid so that the latter will remain energized even after switches 298 and 300 are reopened due to release of their actuating buttons. The closing of contacts of 328 results in energization of the motor, with the result that the cams start to turn. As soon as the lobe of cam 282A has moved far enough to release the operator member 290 of switch 288, the latter will change states, i.e. it will close on its contact 332 and open on its contact 334. The latter action interrupts the holding circuit for the solenoid, with the result that the two sets of relay contacts 328 and 336 both reopen. However, the motor continues to operate since the motor control switch is closed on its contact 332. The motor continues to run until the other lobe of cam 282A engages and biases upwardly the operator member of motor control switch 288. When this occurs, switch 288 reopens on its contact 332 to shut off the motor and recloses on its contact 334 so that a holding circuit for the relay solenoid may be reestablished when the start switches 298 and 300 are reclosed by the operator.

The following sequence of operation occurs on movement of the cams of the programmer: Valve 286A is opened by cam 282B so as to introduce air to the cylinder of actuator 66, whereupon the actuator drives the knife support block 72 downwardly. At this point it is to be noted that the valve 286B is in the condition such that the actuators 34 and 36 are holding the splicing blocks 30 and 32 in the open or spaced position shown in FIG. 1. The cutters 78 and 80 remain in the angular orientations shown in FIG. 1 until the cams 82 and 84 carried by the knife support blocks pass below the two guide plates 86 and 88. The cams clear the guide plates 86 and 88 immediately before the cutter blocks 78 and 80 reach the upper edges of the confronting vertical surfaces of plates 45 and 47. As they move downward, the cutter blocks 78 and 80 engage the projecting terminal portions of the tape ends supported on the two splicing blocks which are separated as shown in FIG. 1. The result in a hammer-like shearing action produced by the outer inclined surfaces 78A and 80A of the two cutter blocks. Actuator 66 drives the knife support block 72 down between the spaced splicing head, this action being permitted by virtue of the fact that the engagement of the cutter blocks with the upper edges of plates 45 and 47 forces the cutter blocks to rotate to the position shown in FIG. 5A. As or immediately after the knife assembly engages resilient pad 96, can 282C causes valve 286B to reverse states so that actuators 34 and 36 are caused to extend their piston rods and thereby bring the splicing heads 30 and 32 together. This condition of the machine is illustrated in FIG. 6.

As soon as the splicer blocks have come together, cam 282D to change states, with the result that actuator 144 is operated so that its piston rod is extended, whereby the splicing tape dispenser-applicator unit 12 is moved downwardly. The splicing tape dispenser-applicator unit 12 moves downwardly far enough for its plate 222 to engage the splicer block 30. Then while the splicing tape dispenser-applicator is in this position, cam 282E causes valve 286D to change states, whereupon the actuator 228 is operated so as to extend its piston rod. This in turn causes the plunger 238 to move downwardly in the channel 225. At the same time the change of state of valve 286D causes the actuator 293 to open the vacuum pilot valve 291, whereupon vacuum is applied to the plunger 238 via the fitting 252.

The applied vacuum, transmitted through the opening 250, causes that portion of the tape 172 which extends across the channel 225 to be drawn against the pad 246 on the underside of plunger 238 between the pins 254. As the plunger 238 moves downwardly, the knife blade 244 coacts with the plate 222 to sever that portion of the tape which extends across the channel 225. The plunger 238 moves downwardly far enough for the pad 246 to apply the severed pieces of tape 172 onto the abutting ends of the two piece of magnetic tape held by suction in the grooves 54 and 56 of the two splicer blocks. Thereafter the cam 282E causes the valve 286D to return to its original state, whereupon the actuator 228 is caused to retract its piston rod and thereby raise the splicing tape dispenser-applicator to its original position (FIG. 1). Simultaneously, the flow of air to the actuator 293 is terminated, causing the vacuum pilot valve 291 to close, with the result that the section of tape held against the pad 246 by suction is released and remains engaged with the abutting ends of the magnetic tape supported on the two splicing blocks. Thereafter the cam 282F causes the valve 286E to change states, with the result that actuator 112 is caused to retract its piston rod 110. The retracting movement of piston rod 110 causes the actuator 100 to pivot clockwise, as viewed in FIG. 1. The clockwise movement of actuator 100 stops when the roller 118 engages the magnetic tape supported on splicer block 32. Then while the piston rod 110 of actuator 112 is still retracted, cam 282G causes valve 286F to open, with the result that the piston rod of actuator 100 is extended. This action causes the roller 118 to roll from splicer block 32 to splicer block 30 so as to press the applied piece of splicing tape tightly against the abutting ends of the magnetic tape. Cam 282G holds valve 286F open only briefly, so that the actuator 100 is caused to retract its piston rod as soon as the roller 118 has reached the limit of its extension stroke. Immediately after or as soon as the piston rod of actuator 100 has been retracted, cam 282F causes valve 286E to change states again, whereupon the actuator 112 is caused to again extend its piston rod and thereby pivot the actuator 100 back to its original raised position (FIG. 1). Thereafter the cam 282C causes valve 286G to reverse states again, with the result that actuator 34 and 36 causes the splicing blocks 30 and 32 to move away from each other back to their original separated positions. As soon as the splicing blocks have been separated, cam 282B causes valve 286A to reclose, whereupon the built-in spring of actuator 66 causes the latter's piston rod to be retracted so as to restore the knife assembly to its original raised position. As the knife assembly moves upward, the cams 82 and 84 engage the bottom edges of the inner faces of guide plates 86 and 88 and are thereby cammed back to their original position (FIG. 2). This rotational movement of the two cams causes the knife blocks 78 and 80 to rotate clockwise and counterclockwise respectively so that they are again oriented as shown in FIG. 1. The upward return movement of the knife assembly lifts the spliced magnetic tape off of the splicing blocks. As this occurs, the spliced magnetic tape usually falls off of the knife blocks toward the operator. In those instances when this does not occur, the operator merely lifts the spliced tape off of the knife assembly. At this point the machine stops due to the switch 288 being returned to its original condition by the second lobe of cam 282A. The machine is now ready for a new cycle of operation which will not occur until the operator depresses the two switch buttons 302 and 304 simultaneously. It is to be noted that because of the dual lobe design of the cams 282A–G, a complete cycle of operation occurs once for each 180° of revolution of the programmer's cam shaft 278.

The lay down roller mechanism (actuators 110 and 112) is optional. In most cases, the splicing tape dispenser-applicator applies the severed segment of splicing tape with sufficient force and maintains pressure on the splicing tape for sufficient time to form a strong butt joint. The use of lay down roller 118 provides insurance that the splicing tape is firmly attached to the joined ends of the magnetic tape.

It is to be noted further that the specific form of knife mechanism herein described and illustrated offers the advantage of providing a sharp anvil-like cutting operation so that the newly formed edges of the magnetic tape are straight and clean, with the result that when the two splicing blocks 30 and 32 are brought together, the ends of the magnetic tape will be in abutting or near-abutting relation with each other. This provides a butt joint of highly acceptable quality. A further advantage of the knife mechanism is that when one cutting side of cutter blocks 78 and 80 is worn, the knife blocks may be rotated on the shafts 74 and 76 so that an unused side surface of each block may be employed for cutting.

As used in the following claims, the term tape is intended to embrace articles such as magnetic tape, photographic film, paper strips and other materials which can be tailored and spliced together as hereinabove described.

Also, although the invention has been described in connection with splicing together the opposite ends of a single tape, notably magnetic tape for an 8-track cartridge, it also is useful in splicing together the ends of two tapes, e.g. two lengths of magnetic tape or a leader tape and a length of magnetic tape. Hence, as used in the following claims and unless indicated otherwise, the term "two sections of tape" is intended to denote the opposite end sections of one roll or length of tape or the end sections of two discrete rolls or lengths of tape.

It is to be appreciated that the splicing tape dispenser-applicator 12 and pressing roller assembly 14 may be omitted from the apparatus, in which case the latter still has utility in tailoring the sections of tape and positioning the tailored ends for splicing, with the piece of splicing tape being applied by hand to the tailored ends of the tape sections while the splicing blocks and cutter assembly are being held in the positions shown in FIG. 6.

Although in the preferred embodiment of the invention vacuum is applied constantly to the splicing blocks, it is appreciated that the programmer 270 may be modified, e.g. by addition of another cam and a cam-controlled vacuum valve, so that vacuum is applied constantly to the grooves 54 and 56 except for a short period commencing after the splicing tape has been applied and before reseparation of the splicing blocks and ending after the cutter assembly has been restored to its elevated at-rest position.

It also is contemplated that one splicing block may be stationary and the other may be moveable, in which case the piston rod of the actuator for the moveable splicing block must have a longer stroke and the cutter assembly must be displaced along the axis of movement of the movable splicing block by an amount sufficient for it to coact with the splicing blocks in the manner previously described.

What is claimed is:

1. Method of splicing together two sections of tape comprising holding said two sections of tape on two spaced splicing blocks so that portions of said sections project beyond confronting end surfaces of said blocks, rapidly engaging said sections of tape at said end surfaces with knife means that are inclined with respect to said end surfaces so that said projecting portions are sheared off to form sharp end edges on said tape sections that are flush with said end surfaces and said knife means strike the edges of said end surfaces, rotating said knife means so that they can clear said end surfaces and moving said knife means between and beyond said blocks, stopping said knife means beyond said blocks, moving said blocks together so that the newly formed sharp end edges of said tape sections are next to one another, and adhesively securing a piece of splicing tape to said sections of tape in overlapping relation to said sharp end edges.

2. Method according to claim 1 wherein said knife means are rotated by reaction forces generated responsively to the striking of the edges of said end surfaces by said knife means.

3. Method according to claim 1 further including the step of rolling a roller under pressure over said splicing blocks so as to firmly press said piece of splicing tape into firm adherence with said sections of tape.

4. Apparatus for severing terminal portions of two sections of tape to provide sharp straight end edges whereby said two sections of tape may be spliced in a butt joint comprising: first and second blocks each adapted to support one of said sections of tape, with the section of tape on one block aligned with the section of tape on the other block; means mounting said blocks for reciprocal movement toward and away from one another between a first position in which said blocks are in substantial engagement with each other and a second position in which said blocks are spaced from each other a predetermined distance, first means for moving said blocks to said first position; second means for moving said blocks to said second position; a cutter assembly comprising a cutter support and first and second cutter members mounted to said cutter support; means mounting said cutter assembly for reciprocal movement along a path extending between said blocks when said blocks are in said second position; third means for reciprocating said cutter assembly along said path, said first and second cutter members each having a cutting surface with said cutting surface normally disposed to be intercepted by edge surfaces of said first and second blocks respectively when said blocks are in said second position and thereby sever portions of tape that project over said edge surfaces, said cutter member being moveably mounted to said cutter support so as to be moveable by engagement with said edge surfaces to positions whereby said cutter members can pass between said blocks after severing said portions of tape; and means for operating said first, second and third means.

5. Apparatus according to claim 4 wherein said cutter members are rotatably mounted to said cutter support with their axes of rotation each extending at substantially a right angle to said path of movement of said cutter assembly.

6. Apparatus according to claim 5 wherein said cutter members are affixed to shafts that are rotatably mounted to said cutter support.

7. Apparatus according to claim 6 wherein the said cutting surfaces of said cutter members extend parallel to said shafts.

8. Apparatus according to claim 6 wherein the said cutting surfaces of said cutter members are spaced radially of said shafts.

9. Apparatus according to claim 6 wherein said cutter members each have at least one additional cutting surface, and further wherein said cutter members are releasably affixed to said shafts whereby said cutter members may be rotated on said shafts so that said additional cutting surfaces may be disposed for interception by said splicing blocks.

10. Apparatus according to claim 6 including means for co-acting with said shafts to hold said cutter members with their cutting surfaces in inclined positions relative to said splicing blocks and to release said cutter members for rotation as they move into engagement with said splicing blocks.

11. Apparatus for use in tailoring and splicing together two sections of tape comprising a pair of splicing blocks each having means for supporting one of said sections of tape in aligned relation to the other section of tape, said splicing blocks having confronting end portions, first motion-producing means for effecting relative reciprocal movement of said splicing blocks so as to selectively separate or bring together said confronting end portions, a cutter assembly for cutting off portions of said tape sections projecting beyond said confronting end portions of said splicing blocks, second motion-producing means for moving said cutter assembly between a first position wherein said cutter assembly is disposed to one side of said splicing blocks and a second position wherein said cutter assembly is disposed to the opposite side of said splicing blocks, said cutter assembly comprising a cutter support and a pair of cutter members carried by said cutter support for movement therewith, said cutter members each having a cutter surface for coaction with one of said blocks, said cutter support being attached to said second motion-producing means for movement thereby from one to the other of said first and second positions, said cutter members being disposed so that on cutter assembly movement from said first position toward said second position with said blocks separated said cutter surfaces will be intercepted by and coact with said confronting end portions of said blocks to produce a hammer-like shearing action on said projecting portions of said tape sections, said cutter members also being disposed with respect to said cutter support so that on interception of said cutter surfaces by said confronting end portions with said blocks separated they will move relative to said cutter support to the extent required to permit the cutter assembly to pass between said separated splicing blocks, and means for controlling said first and second motion-producing means so that said splicing blocks and cutter assembly are operated sequentially as follows: (a) said splicing blocks are moved to separate said end portions; (b) said cutter assembly is moved from said first position to said second position; (c) said splicing blocks are moved to bring together said end portions; (d) said splicing blocks are moved to separate said end portions; and (e) said cutter assembly is moved from said second position back to said first position.

12. Apparatus according to claim 11 wherein said cutter members are rotatably mounted to said cutter support with the axes of rotation of said cutter members both extending at a right angle to the path of movement of said cutter assembly.

13. Apparatus according to claim 1 further including means for holding said cutter members so that said cutter surfaces are in inclined positions relative to said splicing blocks when said cutter assembly is in its said first position and for releasing said cutter members for rotation of said cutter surfaces as said cutter assembly moves from its said first position to its said second position.

14. Apparatus according to claim 11 wherein said splicing blocks have aligned grooves for accommodating and aligning said two tape sections, and means including passages in said splicing blocks that communicate with said grooves for holding said tape sections in said grooves by suction.

15. Apparatus according to claim 11 further including a splicing tape dispenser-applicator for dispensing and applying a piece of adhesive-coated splicing tape to two tape sections supported on said splicing blocks, and means for operating said dispenser-applicator after said splicing blocks have been moved in accordance with step (c) and before they have been moved in accordance with step (d).

16. Apparatus according to claim 15 further including a pressing roller, and means for rolling said roller over said splicing blocks after operation of said splicing tape dispenser-applicator and before said splicing blocks have been moved in accordance with step (d).

17. Apparatus according to claim 12 wherein said cutter surfaces are flat and the axis of rotation of each cutter member is parallel to the plane of its said cutter surface.

References Cited

UNITED STATES PATENTS

| | | | |
|---|---|---|---|
| 3,162,565 | 12/1964 | Miller et al. | 156—506 |
| 3,746,599 | 7/1973 | Peeters et al. | 156—505 |
| 3,537,940 | 11/1970 | Susumu Nagano | 156—505 |
| 3,596,897 | 8/1971 | Lindsay et al. | 269—21 |
| 3,642,555 | 2/1972 | Kuzuhiro Nagoshi et al. | 156—505 |

WILLIAM A. POWELL, Primary Examiner
BRIAN J. LEITTEN, Assistant Examiner

U.S. Cl. X.R.

156—258, 506, 507, 517, 545

PO-1050
(5/69)

UNITED STATES PATENT OFFICE
CERTIFICATE OF CORRECTION

Patent No. 3,814,652 Dated June 4, 1974

Inventor(s) James L. King

It is certified that error appears in the above-identified patent and that said Letters Patent are hereby corrected as shown below:

Column 13, claim 4, line 47 "surface" (second occurrence) should be --surfaces--.

Column 14, claim 13, line 60, the numeral "1" should be --12--.

Signed and sealed this 3rd day of December 1974.

(SEAL)
Attest:

McCOY M. GIBSON JR.
Attesting Officer

C. MARSHALL DANN
Commissioner of Patents